(12) United States Patent
Mackie

(10) Patent No.: US 7,069,150 B2
(45) Date of Patent: Jun. 27, 2006

(54) METHOD FOR OPTIMIZING MIGRATION FIELDS USING TIME SLICE ANALYSIS

(75) Inventor: Dwight Mackie, Richmond, TX (US)

(73) Assignee: Fairfield Industries, Inc., Sugar Land, TX (US)

( * ) Notice: Subject to any disclaimer, the term of this patent is extended or adjusted under 35 U.S.C. 154(b) by 545 days.

(21) Appl. No.: 09/737,873

(22) Filed: Dec. 15, 2000

(65) Prior Publication Data

US 2002/0087272 A1   Jul. 4, 2002

(51) Int. Cl.
 *G01V 1/28* (2006.01)

(52) U.S. Cl. .................................................. 702/17
(58) Field of Classification Search ................ 702/14, 702/17, 18; 367/73, 72, 74; 324/303
See application file for complete search history.

(56) References Cited

U.S. PATENT DOCUMENTS 4,964,103 A * 10/1990 Johnson ..................... 367/73
5,500,832 A * 3/1996 Berryhill .................... 367/74
6,151,555 A * 11/2000 Van Bemmel et al. ........ 702/14

* cited by examiner

Primary Examiner—Donald E. McElheny, Jr.
(74) Attorney, Agent, or Firm—Jackson Walker L.L.P; Mark A. Tidwell, Esq.

(57) ABSTRACT

A method for imaging multi-directional fractures in a homogeneous basement utilizing time slices or depth slices to select velocity fields that yield the optimal lithological image of said fracture patterns, especially in 3-D seismic cubes. More specifically, the method involves definition of small data subvolumes within a larger 3-D data volume. The data subvolumes are selected to image a specific target. The subvolumes are imaged multiple times, using prestack time migration with different velocity models. Each of the migrated subvolumes is timesliced at selected time intervals. All timeslices corresponding to a given time are then gathered together from the different migrated subvolumes. Each of the constant time timeslice datasets are run through velocity analysis. In one preferred embodiment, the seismic data itself is used to determine velocity. In another preferred embodiment, velocity is determined through semblance techniques.

16 Claims, 4 Drawing Sheets

METHOD FOR OPTIMIZING MIGRATION FIELDS USING TIME SLICE ANALYSIS

BACKGROUND OF INVENTION

1. Field of the Invention

The present invention relates generally to the field of seismic exploration and, more particularly, to methods of processing 2-D and 3-D seismic data to improve the ability of this data to correctly image the structure and stratigraphy of the subsurface geology. Most particularly, it relates to the use of time slices or depth slices to select velocity fields for imaging multi-directional fractures in a homogeneous basement.

2. Description of the Prior Art

In the field of seismic exploration, it is generally well known that hydrocarbon deposits are most commonly found in sedimentary rocks. More dense types of basement, such as granite rocks were commonly avoided because they were not thought to contain hydrocarbon accumulations within the rock mass itself. More recently, it has been discovered that hydrocarbons may reside in fractures of such basement rock. It is a difficult problem in seismic exploration to image these fractures using the methods of the prior art because they are often a small scale feature and the signal to noise ratio in the basement rock is not at a level where these fractures are easy to identify. For example, if the granitic basement rock is highly fractured, there can be much interference to the seismic response of an individual fracture. This will, in many instances, be caused by the migration velocity field being either too fast or too slow and thus not properly collapsing the hyperbolic seismic response generated by the nearby faults and fractures. The exploration problem leading to the development of the procedure described in this patent application was how to obtain a better image of a fractured or faulted lithological unit, especially in 3-D sections of hard basement rock.

As illustrated in FIG. 1, in the oil and gas industry, seismic prospecting techniques are commonly used to aid in the search for and evaluation of subterranean hydrocarbon deposits. Typically, the goal of seismic prospecting is to construct a 2-D or 3-D representation of a formation in order to identify features that are indicative of hydrocarbons. Seismic prospecting generally consists of three separate stages, namely data acquisition, data processing, and data interpretation. The success of a seismic prospecting operation depends on satisfactory completion of all three stages.

In the first state of seismic prospecting, a seismic source (S) is used to generate a seismic signal that propagates into the earth and is at least partially reflected by subsurface seismic reflectors (i.e., interfaces between underground formations having different elastic properties). These reflectors most often arise as the boundaries between two different types of subsurface strata, and as such, are fairly easy to recognize with the current seismic prospecting techniques of the prior art. In any event, the reflected signals (known as "seismic reflections") are detected and recorded by seismic receivers (R) located at or near the surface of the earth, thereby representing a seismic survey of the subsurface. In a two-dimensional (2-D) seismic survey as shown in FIG. 1, the recording locations are generally laid out along a single straight line, whereas in a three-dimensional (3-D) survey (see FIG. 3) the recording locations are distributed across the surface in a grid pattern. In simplest terms, a 2-D seismic line can be thought of as giving a cross sectional picture, called a "vertical slice" or "vertical section" of the earth layers as they exist below the approximate center point between the shot (S) and geophone (R) location. A 3-D survey, on the other hand, produces a data "cube" or volume that is, at least conceptually, a 3-D representation of the subsurface that lies beneath the survey area. In any event, the recorded signals, or seismic energy data, can then be processed to yield information relating to the subsurface formations identifying such structures as subsurface formation boundaries.

The seismic energy recorded by each seismic receiver during the data acquisition stage is known as a "trace". A modem seismic trace is a digital recording (analog recordings were used in the past) of the acoustic energy reflecting back from inhomegeneties, or reflectors, in the subsurface, a partial reflection occurring each time there is a change in the acoustic impedance of the subsurface materials. The digital samples are usually acquired at 0.002 second (2 millisecond or "ms") intervals, although one millisecond and four millisecond sampling intervals are also common. Thus, each digital sample in a seismic trace is associated with a travel time, and in the case of reflected energy, a two-way travel time from the surface to the reflector and back to the surface again. Further, the surface location of every trace in a seismic survey is carefully recorded and is generally made a part of the trace itself (as part of the trace header information). This allows the seismic information contained within the traces to be later correlated with specific subsurface locations, thereby providing a means for posting and contouring seismic data—and attributes extracted therefrom—on a 2-D or 3-D map (i.e., "mapping").

Once the seismic data has been acquired, it is then processed during the second stage of seismic prospecting so that the traces will accurately represent the subsurface. This processing typically involves the use of various mathematical algorithms that are applied to the data to enhance its signal content and generally make it more amenable to interpretation. One of the main objectives of the data processing stage is to remove or at least attenuate various unwanted seismic energy that accompanies the primary seismic signal when it is recorded. This unwanted energy is typically referred to as "noise", and represents such things as spurious energy traveling through the formation other than primary signal. Various sources of noise include surface noise, i.e., energy arising from surface equipment, instrumentation, weather and the like, as well as sub-surface noise such as multiples, ghosts, refracted signals and the like. Through processing, the strength of the primary signal energy represented in a trace can be enhanced, while the strength of the unwanted noise energy can be weakened, thus increasing the signal-to-noise ratio, or S/N. As mentioned above, noise is particularly significant when mapping fractures within hard, homogeneous basement rock such as granite because the fractures will often not generate a high enough signal to be recognized without some type of signal to noise enhancement. Also there will be a lack of coherent reflectors relating to lithology in such a rock mass because the rock mass does not have the strata that are prevalent in a sedimentary rock mass.

One method for attenuating unwanted noise components in seismic data traces is through the common-midpoint (CMP) "stacking" process as illustrated in FIG. 2. As is well known to persons skilled in the art, the "midpoint" for a seismic data trace is a point generally close to midway between the source location and the receiver location for that trace (see FIG. 1). According to the CMP method, the recorded seismic data traces are sorted into common-midpoint gathers, as shown in "Record 1" of FIG. 2, each of which contains a number of different seismic data traces having the same midpoint but different source-to-receiver offset distances. Prior to stacking, the seismic data traces within each CMP gather must be corrected for various effects such as normal moveout, discussed below. An example of corrected traces is shown in "Record 2" of FIG. 2. These corrected CMP gathers are then summed or "stacked" together yielding a single stacked data trace which is a composite of the individual seismic data traces in the CMP gather. Through stacking of CMP traces, the unwanted energy on any one trace, see "Record 3" of FIG. 2, is reduced when the trace is added with other CMP traces, such that the desired energy is enhanced. Typically, the stacked data trace has a significantly improved signal-to-noise ratio compared to that of the unstacked seismic data traces.

Normal moveout (NMO) is the increase in reflection time of a trace due to an increase in the offset distance between the source and the receiver detecting the signal. As described above, in a CMP gather, each trace generated by a source-receiver pair has an offset that is the distance from the source to the receiver, an azimuth that is the compass direction between the source and receiver, and a midpoint halfway between the source and receiver. As the traces for a CMP gather are plotted adjacent to one another, the reflector along the various traces appears at later points on the time scale because of the longer offsets as the shot and receiver move apart, resulting in a downward curving hyperbolic pattern characteristic on the plot. The time-domain effect of varying offset must be taken into account in the CMP stack process in order for the signal portions of traces of varying offset to properly align and provide an accurate indication of the depth of the reflector. This is typically handled by way of "normal moveout correction" in which the traces corresponding to source-receiver paths of various lengths are time-shifted relative to one another so that their detected reflection events are aligned in time. The amount of the time shift for a given trace will, of course, depend upon its offset distance. It will also depend upon the velocity with which the acoustic energy travels in the strata along the shot-receiver path. Normal moveout correction therefore requires the estimation or determination of a velocity, commonly referred to as the "stacking" velocity, for deriving the necessary time shift as a function of offset. The relationship between offset and the NMO time correction for a given seismic reflection event in a seismic trace, follows the well-known NMO equation:

$$T_X^2 = T_o^2 + (X^2/V_S^2)$$

where $T_o$ is the zero offset reflection time of the reflection, X is the offset distance of the trace being corrected, $V_S$ is the stacking velocity for the reflection event, and $T_X$ is the time at offset X for the reflection event in the trace being corrected.

Conventional derivation of the stacking velocity $V_S$ for NMO correction is typically done in a "best-fit" manner on the hyperbolic curve described above in order to optimize the accuracy of the correction among all of the traces in the gather. For example, a series of corrections based upon multiple trial stacking velocities may be applied to a gather of traces.

Another phenomenon that must be considered in processing data for production of seismic sections useful for analysis is the effect of dip in the subsurface structures. If the subsurface reflecting structure is flat and horizontal, the reflecting point is directly under the midpoint of the source-receiver pair. This is true for all traces in a CMP gather for that point. However, if the reflecting surface exhibits a dip, the reflecting point for a single trace will generally be shifted along the reflecting surface, and will not appear directly under the source-receiver midpoint. The process which alleviates this problem is called migration.

As is well known to those skilled in the art, the dip and location of a reflector on an unmigrated seismic section is rarely representative of the true dip and subsurface location of the structural or stratigraphic feature that gave rise to that reflector. Except in the case where the subsurface consists of homogeneous nearly-horizontal layers, the recorded seismic expression of a structural or stratigraphic event must be migrated before it can be reliably used to locate subsurface features of interest. In areas of steep dip, a reflection that is apparently located directly below a particular shot point may actually be found several hundreds of feet laterally away from that shot point. Additionally, in complex structural areas where faulting, severe asymmetrical folding and sharp synclines are present, diffractions and multiple reflections may interfere with reflections from the primary reflectors to the point where the resulting seismic section bears little or no resemblance to the actual subsurface structure.

Broadly speaking, migration improves a seismic section or volume by "focusing" the seismic data contained therein. Migration improves the seismic image by correcting the lateral mispositioning of dipping seismic reflectors; collapsing diffractions caused by point scattering centers and subsurface fault terminations; resolving crossing reflectors (conflicting dips); and improving the vertical and lateral resolution of the seismic data, among many others. As a general rule, seismic data that have been properly migrated reveal an enhanced or a truer picture of the subsurface than unmigrated seismic data, the ultimate goal of seismic migration being to produce a seismic section or volume that accurately represents the configuration of the geology of the subsurface.

There are two broad variants of seismic migration: migration after stack (post-stack) and migration before stack (prestack). Post-stack migration is applied, as the name suggests, to seismic traces after they have been stacked—a stacked seismic trace being one that is formed by combining together two or more traces to form a single composite trace. Prestack migration, on the other hand, is applied to seismic traces before they have been stacked. Other things being equal prestack migration is always preferred—both theoretically and in practice—because it has the potential to produce a more accurate picture of the subsurface stratigraphy and structure. However, the computational effort involved in computing a prestack migration is many times that required to do a post-stack migration. For 2-D seismic lines, this additional computational effort is generally manageable and prestack migration is often applied to seismic data that has been taken in areas where the subsurface structure is complicated. Also the increased computer power now available has enabled 3-D prestack time and depth migrations to be used on a fairly regular basis.

A further division of seismic migration algorithms may be made based on whether the migration takes place in "depth" or "time." Broadly speaking, the operational difference between the two approaches is that a trace in the seismic volume that results from a depth migration contains digital samples that are separated by units of depth, rather than time. Whereas a seismic trace in a conventional time seismic survey has samples that are spaced some distance Δt apart in time (where, for example, Δt might be 4 ms), successive samples in a depth migrated volume are spaced some depth, say Δz, units apart. Prestack and post-stack migrations may be performed either in time or in depth. Finally, it is well known to those skilled in the art that seismic data that have been migrated in depth may be transformed into a conventional "time" section and vice versa.

In any event, whether the seismic data processing involves NMO correction, migration or some other type of corrective function, the first step in the corrective process is to identify a velocity field that is representative of the signal velocities as the signal travels through the subsurface geology. "Velocity picking" or "velocity analysis" in seismic exploration refers to the selection of one or more velocity functions, usually time or depth dependent, or velocity volumes in order to perform these various mathematical functions on the seismic data.

Generally velocity analysis involves making decisions as to multiples, overpressured zones, etc. Those skilled in the art will understand that such decisions often do not result in optimal clarity of the final result generally due to unknown factors of the earth's subterranean features. For instance, the step of migration may involve making assumptions about velocity modeling techniques where the actual velocity in the relevant portion of the earth's volume may not be precisely known due to various or complex subterranean features. No matter what velocity determination process is used, however, velocity analysis is based in large part on personal interpretation, and therefore, subject to imaging errors, especially with respect to those formation features that are limited in extent, such as basement fractures.

With respect to velocity analysis for NMO, Equation 1 is often utilized since, for a horizontally layered earth having a single horizontal reflector, seismic signal traveltime bears a hyperbolic relation to source-to-receiver offset distance. Commonly, the velocity of the seismic signal $V_S$ is referred to as the "normal-moveout velocity" or "NMO velocity". However, as is well known in the art, the NMO velocity for a CMP gather is not a constant. Typically, the NMO velocity increases as two-way, zero-offset traveltime increases. For this reason, proper stacking of the seismic data traces within a CMP gather requires knowledge of the NMO velocity as a function of two-way, zero-offset traveltime.

Typically, determination of the NMO velocity function is done manually by expert seismic analysts. One conventional method for determining the NMO velocity function is through the use of velocity spectra. According to this method, the individual seismic data traces in a CMP gather are repeatedly NMO-corrected and stacked using a range of trial velocity values. The resulting amplitude or stack power of the stacked traces are then displayed side-by-side on a plane of velocity versus two-way, zero-offset traveltime, producing what is known as the "velocity spectrum". The velocity which results in the highest stacked amplitude for a given reflection is selected or "picked" as the NMO velocity for that reflection. The NMO velocity function may then be expressed as a set of velocity-traveltime pairs. Thus, while many other conventional methods for determining or "picking" the NMO velocity function are known, the goal is to select a velocity model or construct a velocity field that corresponds to the best lineup of the signal along the hyperbolic trajectory over the entire CMP gather. In any event, it should be apparent that the velocity analysis relating to NMO is crucial to proper NMO time correction.

Likewise, it is necessary to define a velocity model before a seismic migration can be performed. Again, the velocity model is just a specification of the subsurface velocity structure as a function of depth for subsurface points located in the vicinity of the survey. The velocity model might be simple (involving only a few layers) or complex, but it has always been the conventional wisdom that the best velocity model is the one that most accurately represents the actual configuration of the rock units in the subsurface. In fact, the modern trend has been to move toward increasingly accurate velocity models in an effort to improve the final migrated product.

The most popular methods of migration in use today are all based ultimately on a solution to the wave equation. As is well known to those skilled in the art, the wave equation is a second order differential equation that describes seismic wave propagation in the subsurface. To the extent that this equation accurately represents seismic wave propagation in the subsurface—and to the extent that the true subsurface velocity and other rock parameters are correctly specified—this equation can be used to migrate seismic data with considerable accuracy, a solution to the wave equation producing the theoretically correct way to migrate seismic data. Of course, for most media the wave equation cannot be solved efficiently, thus some degree of approximation must be introduced into the solution. As a general rule, the better/more precise the approximation is to the true solution, the better the resulting migration. As might be expected though, the more accurate the approximation, the greater the amount of computer time required to perform the migration. Thus, the most desirable migrations are those that use the highest fidelity wave transmission model, the disadvantage of this sort of models being that the computer time necessary to calculate a migration is lengthened accordingly.

The most common approaches to wave equation (based) migration are finite-difference methods, frequency domain (f-k) approaches, and Kirchhoff integral migration. Each of these methods has its advantages and disadvantages. No matter which migration method is used, however, seismic migration is a computationally intensive process, even for simple velocity models. In the case of 2-D data, modem computer speeds (coupled in some cases with the use of parallel and massively parallel processors) have made post-stack migration a routine processing step for seismic lines, and prestack migration, although correspondingly more costly from a computation standpoint, is also done rather routinely. However, the computational costs associated with a full prestack migration of 3-D seismic data are comparatively high. By way of example, a 3-D survey might consist of one million or more CMPs (e.g., a grid of 1024 CMPs by 1024 CMPs), each of which might be 40 to 60 fold. Thus, as many as 40 to 60 million unstacked seismic traces might be collected in a typical 3-D survey.

Generally, the prior art methods of performing velocity analysis are predominantly performed using vertical slice analysis to determine the velocity field that best flattens a reflector in a common midpoint (CMP) sort or to determine the velocity that gives the strongest stack or migrated response by the use of constant velocity stacks or constant velocity migrations. Typically, such methods use data sorted in the inline and crossline directions to determine these velocities. An example of vertical slices in the inline and crossline directions is illustrated in FIG. 3. The vertical slice technique of the prior art permits the analyst to reasonably determine the velocity at essentially a point on the 2-D line or within the 3-D volume. This type of analysis is somewhat limited as each slice will only image a limited area for fault detection. Heretofore, use of horizontal slice techniques in the prior art have been limited only to use in interpretation. More specifically, horizontal time or depth slice techniques as used in the prior art for 3-D data is only used in the interpretive function. Such data permits the geophysicist to obtain a plan view showing such things as the fault pattern as it exists across an area in the xy plane. This knowledge of the fault pattern in a plan view can aid the geophysicist in determining such things as stress orientation, possible hydrocarbon trapping, etc. However, the drawback to the use of horizontal slices only for interpretation is that velocity changes in the plan view are not readily apparent to the analyst. It has been discovered however, as part of the inventive process described herein, that horizontal time or depth slices can be used in the velocity determination across a 3-D volume, thereby permitting the analyst to more easily identify velocity changes across the 3-D volume.

Thus, there is a need for a method to better image fractures in hard basement rock. Additionally, the method should provide for a highly accurate migration at minimal additional computational cost. Accordingly, it should now be recognized, as was recognized by the present inventors, that there exists, and has existed for some time, a very real need for a method of seismic data processing that would address and solve the above-described problems.

SUMMARY OF INVENTION

The major thrust of this patent is in the use of time or depth slices as a velocity determination tool, namely to use time slice data to choose an optimal velocity for migration. To obtain high quality stacked and migrated data the velocity field used for these processes must be optimal considering such things as structural complexity, surface conditions, amount of energy reflected and refracted, the signal to noise ratio of the data, etc. In the present invention, constant velocity migrations are used to create the time slice information. "Time slices" as used herein are data sets obtained by extracting the data from a select volume at a given time.

The main impetus for the invention of this procedure was the realization that the fractures in a hard rock basement were not being optimally imaged when the velocity determination was done in a 2-D line orientation.

More specifically, the procedure of the invention initially involves definition of small data subvolumes within a larger 3-D data volume. The data subvolumes are selected to image a specific target. The subvolumes are imaged multiple times, using prestack time migration (PSTM) with different velocity models. Migrations above the basement utilize a constant velocity model and migrations below the basement utilize several different interval velocity models. For each data subvolume, a migrated subvolume is thus produced. Each of the migrated subvolumes is timesliced at selected time intervals. All timeslices corresponding to a given time are then gathered together from the different migrated subvolumes. Each of the constant time timeslice datasets are run through velocity analysis. In one preferred embodiment, the seismic data itself is used to determine velocity. In another preferred embodiment, in difficult areas, velocity is determined through semblance techniques which improve pattern recognition. In any event, the analysis results in a velocity field data set.

Once again the general purpose of the process under consideration is the use of horizontal time slices as a basis for determining stacking velocity as opposed to the more traditional methods of determining stack velocity. Of course, since time migrations can be transformed into depth migrations, the methods of the invention are applicable to both depth and time migrations.

DESCRIPTION OF THE PREFERRED EMBODIMENT

The present invention provides a new method of selecting optimal velocities for migrating prestack seismic data. This method is particularly useful in identifying small cracks in homogenous basement rock such as granite.

Figure 1:
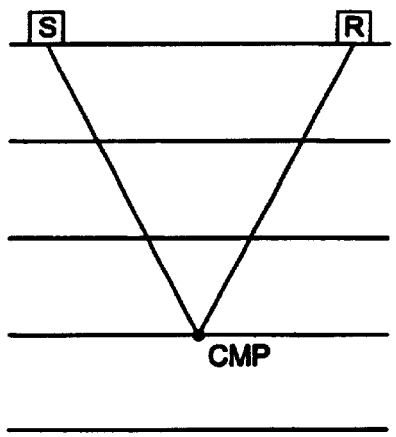
FIG. 1 illustrates generally the environment in which the invention disclosed herein would be used.
Figure 3:
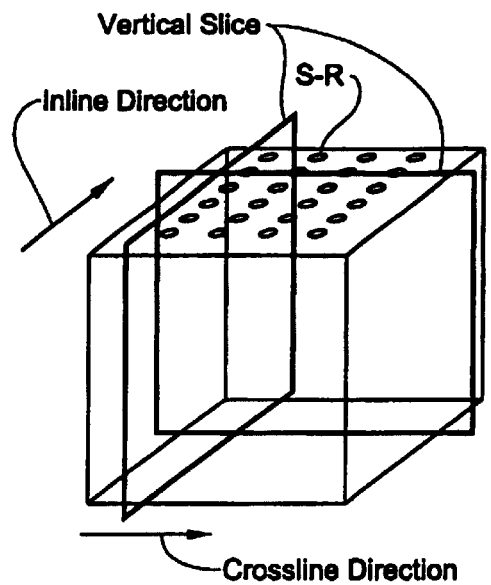
FIG. 3 illustrates a larger 3-D volume representing seismic data acquired from a lithological formation, as well as the vertical slice techniques of the prior art.
Figure 2:
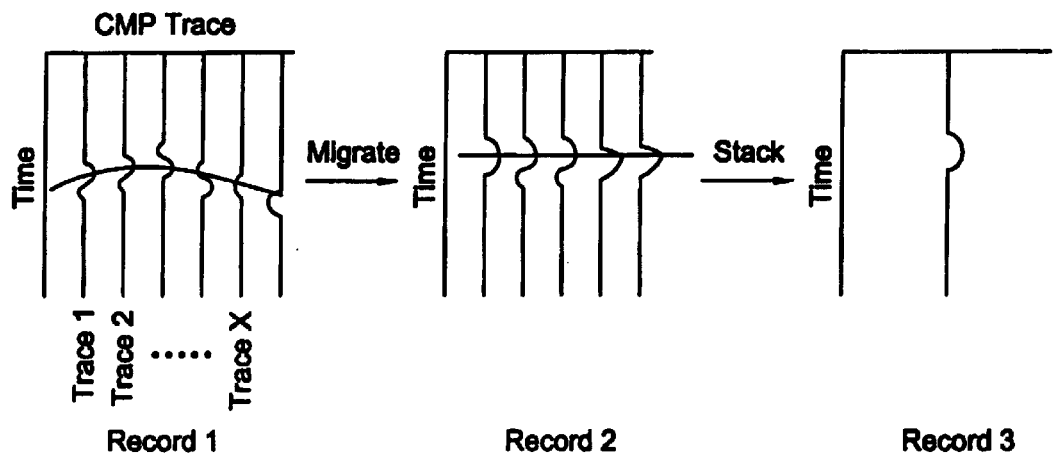
FIG. 2 is a schematic illustrating common data processing techniques of the prior art.
Figure 4:
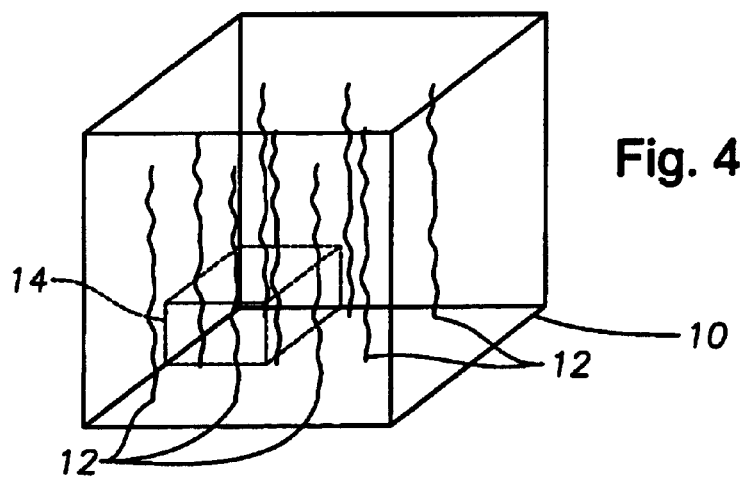
FIG. 4 illustrates the identification of subvolumes within the larger 3-D volume.

With reference to FIG. 4, there is shown a 3-D volume 10 containing data relating to a multiplicity of traces 12 passing through the volume. In the first step of the process of the invention, a plurality of smaller data volumes or "subvolumes" 14 are defined within the larger overall data volume. The specific size and number of the subvolumes 14 are within the discretion of the analyst, but will depend on factors such as the expanse of the overall volume being analyzed, the amount of data passing through a subvolume and the computing power available for analysis of the subvolume data. Once the subvolumes 14 have been identified, they are then migrated multiple times to identify the velocity field which best images the subsurface.

In any event, once the subvolumes 14 have been defined, the data 12 within each subvolume 14 is migrated. Any suitable migration technique may be utilized. In general, a constant velocity is utilized down to the top of the basement, while several different velocity models are utilized below the top of the basement such that the below basement formation is imaged multiple times during the migration process. In the preferred embodiment, subvolumes are selected so that they do not straddle the boundary between the basement and the layer which overlies the basement. More specifically, the velocity models that drive this migration are created in the following manner. First, PSTM is used to output fully migrated velocity analysis in lines. Velocity lines are migrated with a constant velocity in the xy plane only as far as the top of the basement. Below the top of the basement, several different interval velocity models are created. The 3-D input data 12 are migrated several times, one time for each velocity model, and outputted for each subvolume 14.

Figure 5:
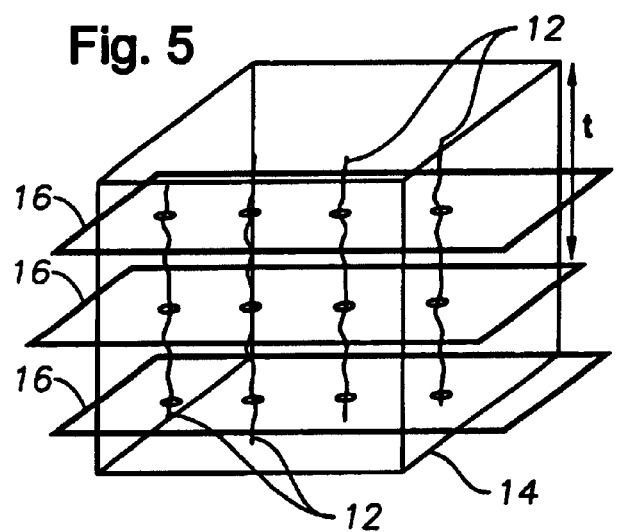
FIG. 5 illustrates the division of subvolumes into horizontal slices.
Figure 6:
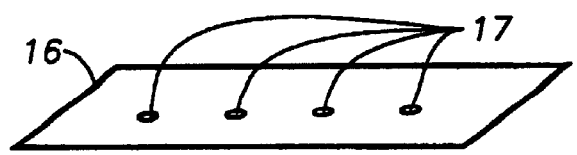
FIG. 6 illustrates the data contained in a single horizontal slice.

As shown in FIG. 5, following migration, each subvolume is horizontally divided into a plurality of slices 16, based on time t, to create a plurality of timeslices 16 for each subvolume 14, wherein each timeslice in a given subvolume is represented by a different time. Each timeslice 16, as better illustrated in FIG. 6, represents the data 17 associated with the seismic traces 12 passing therethrough at the selected time t. While the process of horizontally dividing the subvolume into incremental slices has been described in terms of time, those skilled in the art will understand that such slices could equally well be described in terms of depth since the relationship between depth and time is well known. Thus, a subvolume could be horizontally divided into depth slices rather than timeslices in the process of the invention.

Figure 7:
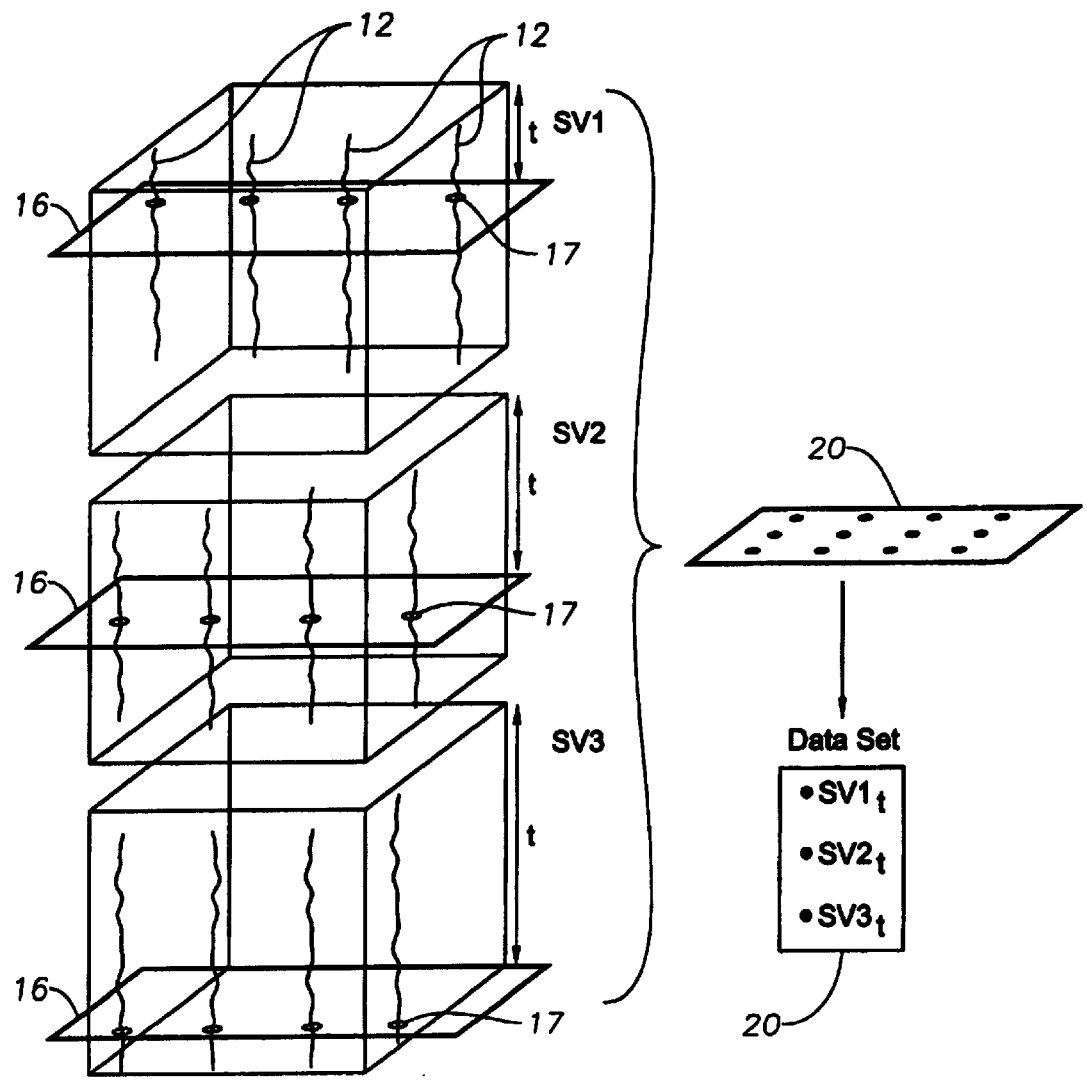
FIG. 7 illustrates the combination of like horizontal slices into datasets.

Once each subvolume 14 has been timesliced, a gather of all similar timeslices ($SV1_t$, $SV2_t$, $SV3_t$, . . . $SV(n)_t$) is performed, as illustrated in FIG. 7. Specifically, for a select time T, the timeslices from all of the subvolumes that correspond to the select time T are gathered together to form a constant time timeslice dataset 20, or Timeslice Variable Velocity Migration (TVVM) set. Each select time T will have a TVVM set defined for the time.

For each TVVM, velocity analysis is then performed on the dataset 20. In many areas, the signal to noise ratio in the rock will be improved by the application of some program to improve the coherency. The velocity analysis can be any standard method. In one preferred embodiment, velocity picking can simply be performed by qualitative analysis of the seismic data itself, wherein a velocity function can be plotted based on select time/velocity pairs. In another preferred embodiment, velocity picking is performed utilizing semblance techniques, wherein stack power is used to identify the velocity field that most closely represents the actual velocity field. The output from this velocity analysis will result in a velocity dataset for each TVVM.

Once the velocity dataset for each TVVM has been determined, subvolumes are reconstructed by extracting the TVVM data for a select time T and reassembling each subvolume to form a migrated subvolume. All of the migrated subvolumes can then be combined together to recreate the overall 3-D volume.

In an alternative embodiment, once the velocity dataset for each TVVM has been determined, the final velocity field can be utilized to create a migrated volume by putting the 3-D dataset back together by choosing the migrated data to use in this reconstitution based on the chosen velocities. More specifically, the migrated data, and more precisely the velocity function, that produces the best image at a particular depth or time is selected from each subvolume and utilized to reconstruct the overall 3-D volume. Thus, while the data is not remigrated, the 3-D volume is reconstituted based on the data that yields the best image of a fracture. Alternatively, rather than putting the data back together using the migrated data from the velocity determination stage, the data can be remigrated using the determined velocity. The particular type of migration used can be left to the individual processor, i.e. there is no reliance on a particular migration program. As was mentioned earlier, the described procedure can be used for depth or time migration.

Figure 8:
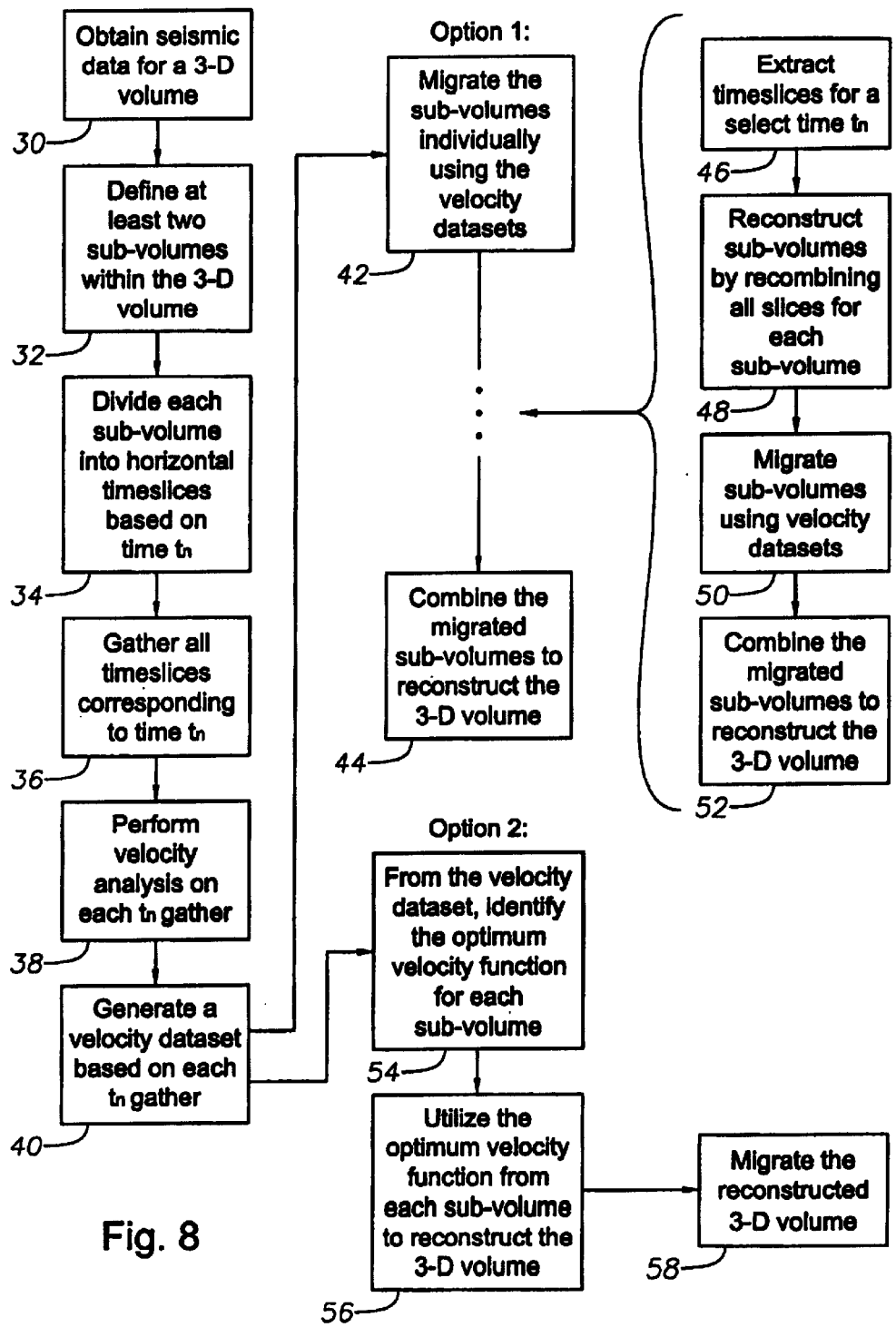
FIG. 8 is a flowchart depicting the steps of the inventive process.

FIG. 8 illustrates a flow chart for the method of the present invention. Option 1 illustrates the first embodiment of the invention as described above, while Option 2 illustrates a second embodiment of the invention. The most novel feature of the process of the invention is the use of datasets derived from horizontally sliced volumes to determine velocity. The process has not been heretofore used in the prior art. More specifically, it is the formation of datasets as gathers of data derived from a plurality of subvolumes at a selected time. Once this gathered datset has been formed, standard velocity analysis techniques can then be used. Those skilled in the art will understand that while some prior art techniques utilize vertical slices to correlate data, there is no prior art that utilizes horizontal slices to pick velocity data. Furthermore, it will be understood that any prior art use of time slices or depth slices has been generally limited only to interpretation, and in such cases, velocity data that resulted in the visual time slices were selected utiliznig vertically constructed slices. Utilizing the time slice process of the current invention, however, permits an alternate view of the data. The visualization and pattern recognition will be different in the time or depth slice mode as opposed to vertical slice mode. An example would be the observance of the sky's star pattern from two different perspectives or angles. The star pattern would have a different look when viewed from different angles. This is the main thrust of this patent, namely to permit a processor or interpreter to get different visualizations of the fractured or faulted rock utilizing a 3-D model constructed from the time slice derived velocity data. FIG. 8 illustrates these steps in more detail. In the first step, represented by box 30, seismic data is obtained and a 3-D volume is defined. In box 32, the 3-D volume is divided into sub-volumes. Once the sub-volumes are defined, each sub-volume is horizontally sliced based on time $t_n$ as illustrated in box 34. All the timeslices for a particular time $t_n$ are then gathered, box 36, and velocity analysis is performed on each timeslice gather, box 38. The velocity analysis on each timeslice gather yields a velocity dataset for each time $t_n$, box 39. At this point, the velocity dataset can be reconstructed into sub-volumes for migration as shown under Option 1 of the optimum velocity function can be identified and used to reconstruct the 3-D volume for migration as shown in Option 2. More specifically, under Option 1, the velocity datasets from box 39 are migrated for each sub-volume, box 42, and the migrated sub-volumes are reconstructed into the 3-D volume, box 44. The individual steps of the process from box 42 to box 44 are shown under Option 1a. As can be seen, the specific process involves extracting timeslices for a select time $t_n$, box 46; reconstructing sub-volumes by combining all timeslices corresponding to a given sub-volume, step 48; migrating the reconstructed sub-volumes using velocity datasets, step 50 and then combining the migrated sub-volumes to resontruct the 3-D volume, step 52. Alternatively, under Option 2, using the velocity dataset from step 40, the optimum velocity function for each sub-volume is identified as shown in step 54. These optimum velocity functions are used to reconstruct the 3-D, step 56, which is then migrated in step 58.

The process described herein yields a velocity field for 3-D data that better images basement fractures, thereby providing better insight into the orientation and structure of the fractures.

Thus, while specific features and embodiments of the invention have been described in detail herein, it will be readily understood that the invention encompasses all modifications and enhancements within the scope and spirit of the following claims.

The foregoing disclosure and description of the invention are illustrative and explanatory thereof, and various changes in the size, shape, materials, components, circuit elemetns, wiring connections and contacts, as well as int eh details of the illustrated circuitry and construction and method of operation may be made without departing from the spirit of the invention.

What is claimed is:

1. A method for imaging subsurface structure and stratigraphy in 3D seismic volumes, the method comprising:
utilizing horizontal slices of a 3D seismic volume to determine the signal velocity that produces optimal imaging of the subsurface structure and stratigraphy.

2. A method for imaging fracture patterns in lithological units, the method comprising:
obtaining seismic data for a three dimensional lithological volume;

defining at least two subvolumes within said volume;

migrating the data associated with each subvolume;

dividing each migrated subvolume into a plurality of horizontal slices, each of the plurality of horizontal slices associated with a particular index group and having a portion of said seismic data associated therewith;

gathering the seismic data from each of the plurality of horizontal slices of all subvolumes associated with the particular index group into a dataset; and performing velocity analysis on each dataset created in the preceding step.

3. The method of claim 2, wherein the index groups are selected based on intervals of time.

4. The method of claim 2, wherein the index groups are selected based on intervals of depth.

5. The method of claim 2, further including the step of performing semblance calculations on the velocity dataset.

6. The method of claim 2, wherein the data is processed using a signal to noise enhancement program before velocity analysis.

7. The method of claim 1, wherein the step of horizontal slicing is based on depth.

8. The method of claim 1, wherein the step of horizontal slicing is based on time.

9. The method of claim 1, further including the steps of migrating the data associated with the 3D seismic volume prior to horizontal slicing.

10. The method of claim 2, wherein the step of migrating the data associated with each subvolume includes migrating the data multiple times to identify a desired velocity field.

11. The method of claim 2, further including the steps of:

determining from the performance of velocity analysis a plurality of velocity datasets;

reconstructing subvolumes after velocity analysis by extracting data from each of the plurality of velocity datasets and reassembling each subvolume to form a migrated subvolume; and combining all of the migrated subvolumes to recreate the overall three-dimensional volume to substantially enhance the image of the original three-dimensional lithological volume.

12. The method of claim 2, wherein a final velocity field derived from the velocity analysis of the gathered dataset is utilized to create a migrated volume by reassembling the three-dimensional dataset by choosing the migrated data to use in the reassembly based on selected velocities.

13. The method of claim 2, further includes:

selecting a velocity function that produces a desired image determined during the velocity analysis from each migrated subvolume; and utilizing the velocity function to reconstruct the overall three-dimensional volume.

14. The method of claim 13, further including the step of remigrating the data using the selected velocity function.

15. A method of analyzing seismic data; the method comprising:

migrating at least two defined subvolumes within an original three-dimensional lithological volume represented by seismic data;

dividing each migrated subvolume into a plurality of horizontal slices, each of the plurality of horizontal slices associated with a particular index group and having a portion of the seismic data associated therewith; and performing velocity analysis on each of a plurality of datasets to thereby determine an optimal velocity for each dataset, each of the plurality of datasets having at least one of the plurality of horizontal slices with a portion of the seismic data associated therewith.

16. The method of claim 15, wherein the step of migrating the data associated with each subvolume includes migrating the data multiple times to identify a desired velocity field.

\* \* \* \* \*